No. 846,654.  
PATENTED MAR. 12, 1907.  
C. H. ERICKSON & J. P. NYSTROM.  
FRICTION CLUTCH.  
APPLICATION FILED JUNE 4, 1906.
2 SHEETS—SHEET 1.
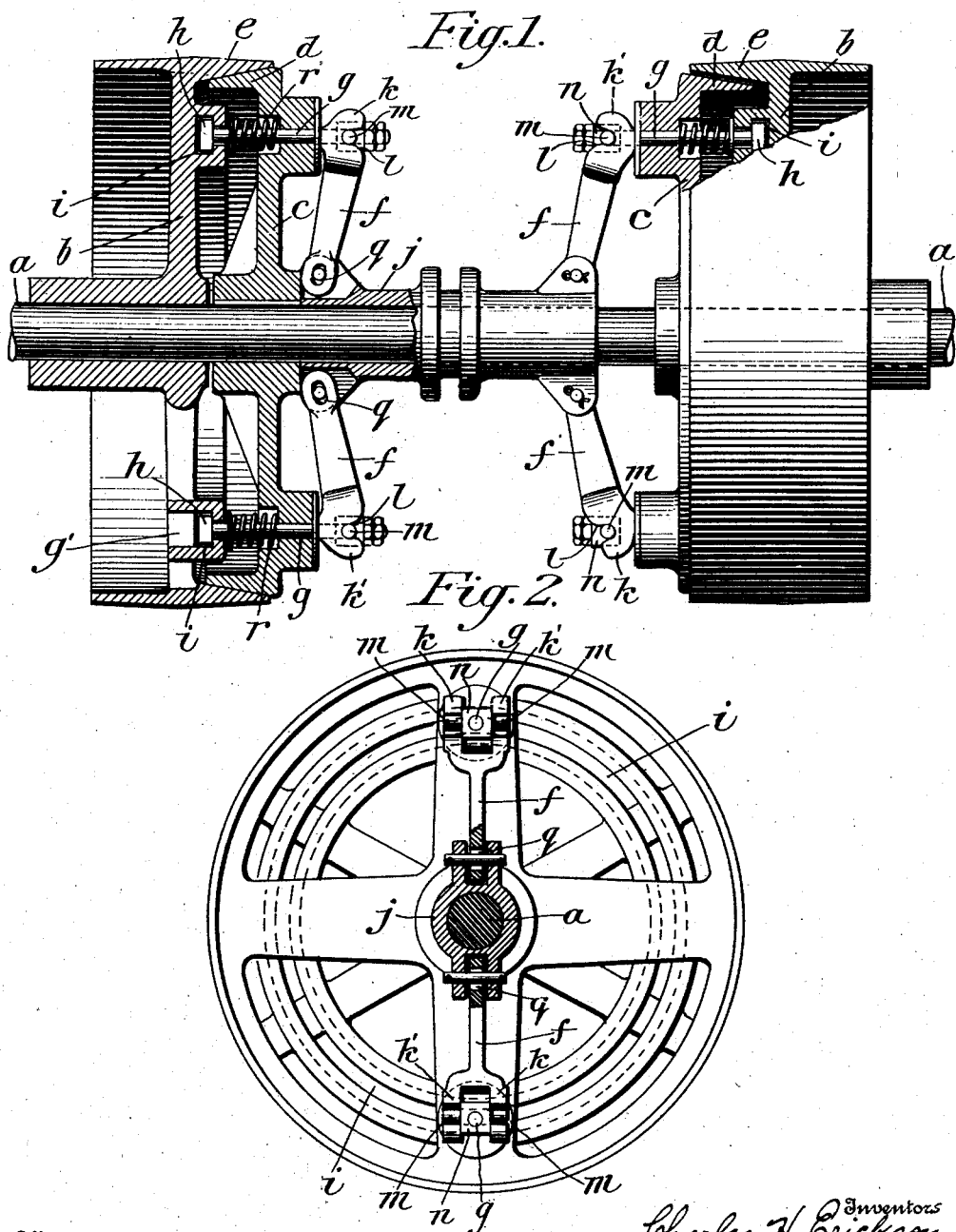
Witnesses  
Inventors  
Charles H. Erickson,  
John P. Nystrom,  
by Pennie & Goldsborough  
Attorneys No. 846,654. PATENTED MAR. 12, 1907.
C. H. ERICKSON & J. P. NYSTROM.
FRICTION CLUTCH.
APPLICATION FILED JUNE 4, 1906.

2 SHEETS—SHEET 2.

Witnesses
Inventors
Charles H. Erickson,
John P. Nystrom,
by Pennie & Goldsborough
Attorneys

UNITED STATES PATENT OFFICE.

CHARLES H. ERICKSON AND JOHN P. NYSTROM, OF CLEVELAND, OHIO.

FRICTION-CLUTCH.

No. 846,654.      Specification of Letters Patent.      Patented March 12, 1907.

Application filed June 4, 1906. Serial No. 320,146.

*To all whom it may concern:*

Be it known that we, CHARLES H. ERICKSON and JOHN P. NYSTROM, both citizens of the United States, and both residing in the city of Cleveland, county of Cuyahoga, State of Ohio, have invented certain new and useful Improvements in Friction-Clutches; and we do hereby declare the following to be a full, clear, and exact description of the invention, such as will enable others skilled in the art to which it appertains to make and use the same.

The invention relates particularly to clutches for power transmission in which motion is imparted from a driving member to a driven member by means of friction between the two members, one of the members being capable of a shifting movement for the purpose of producing the desired frictional engagement.

The particular object in view is to provide a clutch which is adapted for use either as a shaft-coupling or as a pulley-clutch, the same being so constructed that practically all of the working parts of said clutch are situated within the outer belt-pulley and completely inclosed therein, thereby requiring but small space on the shaft for the clutch.

The invention also aims to produce a simple, durable, and efficient construction involving but few parts and arranged so that ease and certainty of operation can be relied on.

The invention is illustrated in the accompanying drawings, wherein—

Figure 3:
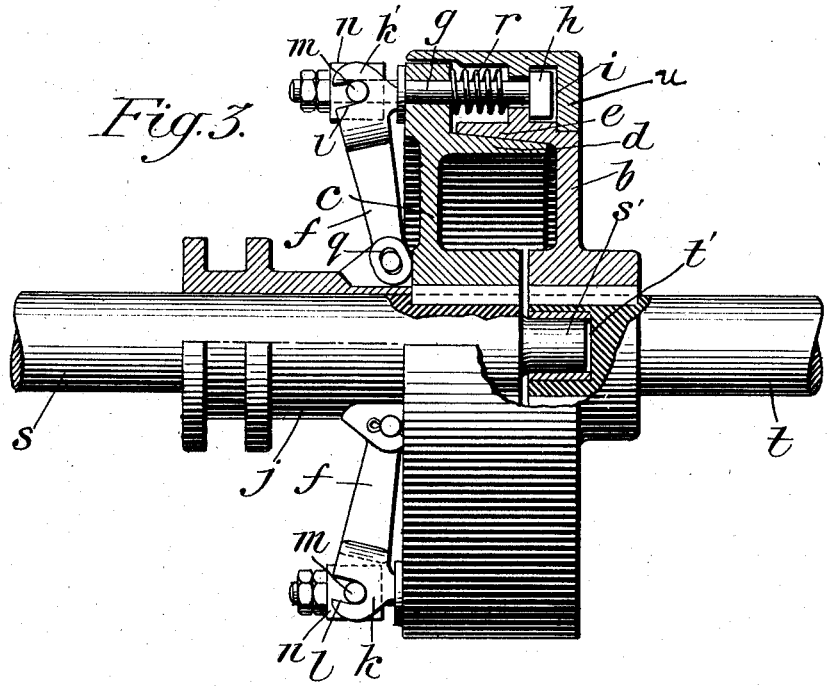
Figure 4:
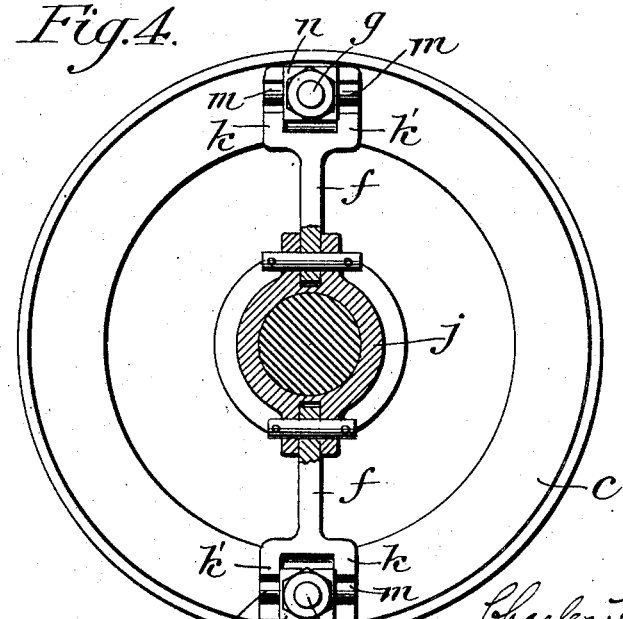

Figure 1 is a view, partly in elevation and partly in section, showing two clutches on a single shaft, one clutch being shown in operative position and the other in inoperative position. Fig. 2 is a front view of one of the clutches shown in Fig. 1. Fig. 3 is a view, partly in elevation and partly in section, of the invention as applied to a divided shaft, the same also showing a modified form of belt-pulley; and Fig. 4 is a front view of the clutch as shown in Fig. 3.

Referring to these views, $a$ denotes the driving-shaft, and $b$ the part to be driven, which in the present instance is an ordinary belt-pulley. Motion is transmitted from the shaft to the driven member by a driver $c$, that is fixedly secured to and revolves with the shaft. This driver, as shown in Figs. 1 and 2 of the drawings, is in the form of a disk having a crown-flange $d$ extending around its periphery, the flange being beveled on its outer face for the purpose of coöperating with a correspondingly-beveled face on the driven member, that will be presently described in detail. The driven member has also the general form of a disk, with a crown-flange $e$ extending all around its periphery and forming a housing into which fits the disk-like driving member and other of the working parts of the clutch. The inner face of the crown-flange $e$ is also beveled, as shown, and, as has been heretofore stated, is adapted to contact with the correspondingly-beveled face on the crown-flange $d$ of the driving member in making the desired frictional engagement between the driving and driven parts. The housing is loose on the shaft and adapted to move endwise or longitudinally of the shaft into and out of engagement with the clutch member $c$ by mechanism which will be presently described.

The engagement and disengagement of the clutch members is effected by means of a number of similar toggle mechanisms comprising in each instance a cam-lever $f$, which is pivotally attached to a connecting rod or bolt $g$. The rods or bolts $g$ are provided with enlarged heads $h$, that are adapted to slide and work freely in an annular T-slot $i$, formed in the driven part $b$ of the clutch, said bolts also passing through suitable openings in the driver $c$ to the opposite side thereof, where they are pivotally attached to the cam-levers $f$, as heretofore described. Suitable provision, such as an opening $g'$, is made in the form shown in Figs. 1 and 2 for the inserting of the bolts into the slot.

The cam-levers are all pivotally connected to a collar $j$, mounted on the shaft, as illustrated in the drawings, and said levers extend radially from the collar, the collar being adapted to slide on the shaft and rotate with it and the driving member. The collar is operated in a well-known way by a clutch-lever, (not shown,) and the cam-levers, which are pivoted thereto, operate with a toggle-like action to pull the driven pulley $b$ through the medium of the rods or bolts $g$ into frictional contact with the driving-disk whenever the collar is slid toward said driving-disk.

In order to make connection between the cam-levers and the rods $g$, the said levers are bifurcated at their ends, as shown, forming two short arms $k\ k'$, which straddle the outer end of the rod, each arm being provided with a recess $l$, adapted to receive the trunnions $m$, formed on the ends of a block $n$, which is swiveled and adjustably mounted upon the rod or bolt $g$. Suitable adjusting-nuts and lock-nuts are also provided for holding the parts in adjusted position. It will thus be seen that the cam-levers are securely but detachably connected to the rods or bolts $g$ and can be readily removed from the clutch and replaced by new ones at any time. It is also to be noted that the cam-levers at their ends where they are attached to the collar $j$ are provided with elongated slots $q$, which allows for the sliding movement of the collar in operating the clutch.

On each of the rods or bolts $g$ is coiled a spring $r$, resting with one end against the clutch member $b$ and pressing with its other end against the clutch member $c$, so as to normally hold the clutch member $b$ apart from the clutch member $c$ to keep the clutch out of action, but adapted to be compressed sufficiently for making frictional contact between the members when the toggle mechanism is operated.

In the form of the invention shown in Figs. 1 and 2 it is evident that the shaft $a$ could normally remain stationary and likewise the member $c$ and the operating devices connected thereto, and that the member $b$ might be connected up to a suitable motor by means of a machine-belt, so that the said pulley or member $b$ would revolve continuously. In operating the clutch in this manner it is to be noted that the member $b$ would be the driving member and the member $c$ would be the driven member and that the shaft $a$, which is fast to the member $c$, would in consequence be rotated when the driving member $b$ and the driven member $c$ were coupled together in the manner which has heretofore been described.

Referring now particularly to the modification shown in Figs. 3 and 4, it is to be noted in the first place that the invention is illustrated as applied to a divided shaft, which shaft comprises the section $s$, formed with a reduced end $s'$, and the section $t$, having a central recess $t'$, adapted to receive the reduced end of the section $s$. In this form of the invention the driven member is keyed to the shaft-section $t$ and the driving member is keyed to the shaft-section $s$, similar toggle mechanism, as shown in Figs. 1 and 2, being used for drawing the sections together in making the desired frictional engagement between the clutch members. It will, however, be noted that the driven member, or, in other words, the belt-pulley, is somewhat differently constructed, the same being made in two parts, one of said parts being similarly constructed to the driven member shown in Fig. 1—that is to say, having the form of a disk, with the crown-flange $e$ beveled upon its inner face to contact with the beveled face of the crown-flange $d$ on the driving member. The other part of the driven member is illustrated at $u$ and, it will be observed, is in the form of a housing which completely incases the main working parts of the clutch. It will be further noted that the two parts of the belt-pulley are so constructed that when they are placed in assembled position the annular T-slot is formed between the parts to receive the enlarged heads $h$ of the bolts $g$.

It is to be understood that either form of the invention—that is to say, the one shown in Figs. 1 and 2 or that shown in Figs. 3 and 4—can be used either as a pulley-clutch or as a coupling for divided shafts.

The operation of the device is so simple that a thorough understanding of the mechanism and the functions performed by the same will be readily had after an examination of the drawings, and a further detailed description will be unnecessary.

What we claim is—

1. A friction-clutch, comprising a belt-pulley having a rim or flange tapered inwardly on the underside, a disk or spider having a rim or flange projecting into the pulley-rim and exteriorly tapered to fit the taper of the pulley, an annular slot or recess in the pulley, a plurality of bolts, the heads of which play in said slot, and which pass loosely through holes in the spider, springs encircling the bolts and reacting between the pulley and the spider to hold the tapered surfaces apart, cam-levers pivotally connected at their outer ends to the outer ends of the bolts, and means for simultaneously moving the inner ends of the levers to press the tapered surfaces together.

2. A friction-clutch, comprising a belt-pulley having a rim or flange tapered inwardly on the under side, a disk or spider having a rim or flange projecting into the pulley-rim and exteriorly tapered to fit the taper of the pulley, an annular slot or recess in the pulley, a plurality of bolts the heads of which play in the slot and which pass loosely through holes in the spider, springs encircling the bolts and reacting between the pulley and spider to hold the tapered surfaces apart, trunnioned swivels carried by the outward ends of the bolts, levers pivoted at their outer ends to the trunnions of the swivels and having cams bearing upon the spider, a loose sleeve on the spider-shaft, and a pin-and-slot connection between the sleeve and the inner ends of the levers.

In testimony whereof we affix our signatures in presence of two witnesses.

CHARLES H. ERICKSON.
JOHN P. NYSTROM.

Witnesses:
FRANK VITCHA,
ERNEST FARROW.